UNITED STATES PATENT OFFICE.

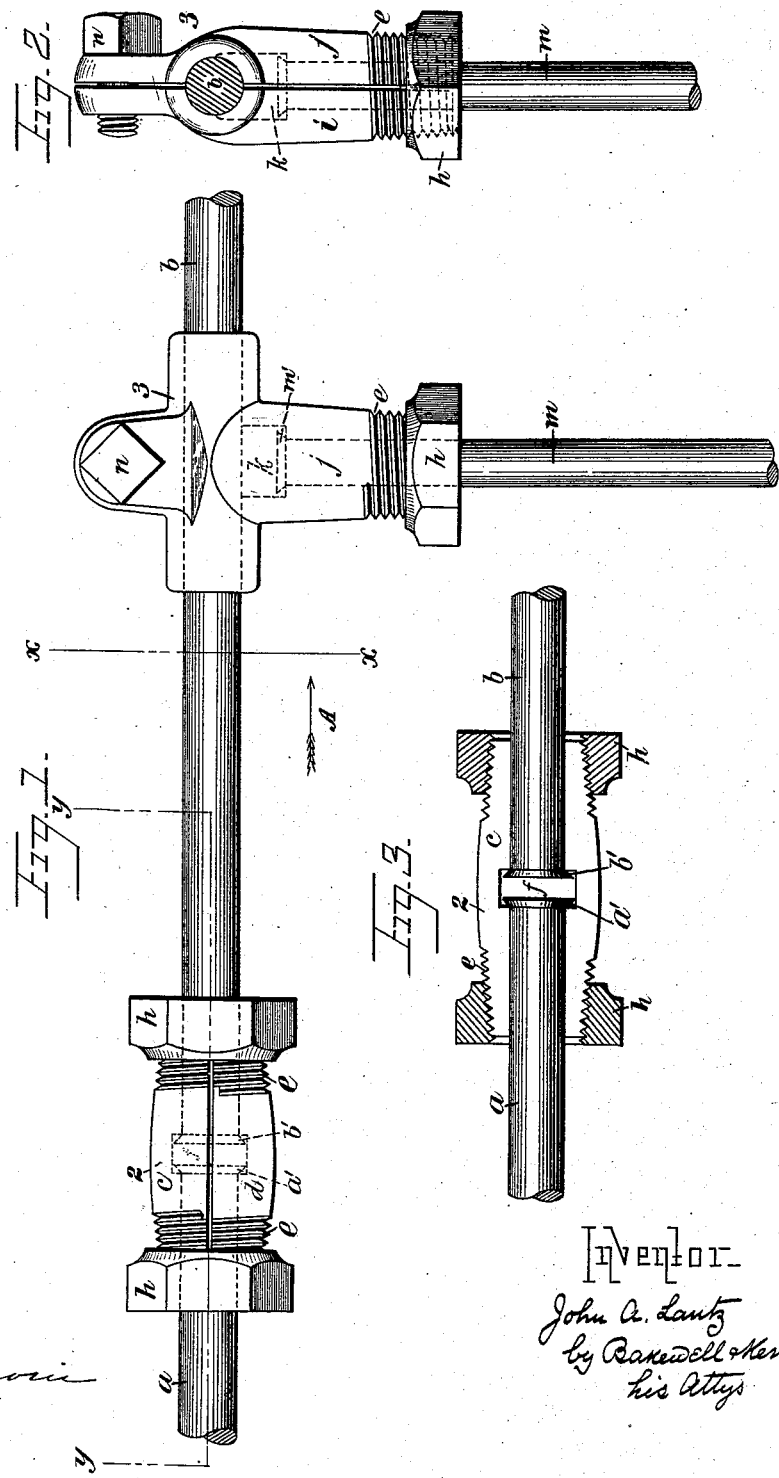

JOHN A. LANTZ, OF PITTSBURG, PENNSYLVANIA, ASSIGNOR TO GEORGE T. OLIVER, OF SAME PLACE.

COUPLING FOR ELECTRICAL WIRES.

SPECIFICATION forming part of Letters Patent No. 349,397, dated September 21, 1886.

Application filed April 8, 1886. Serial No. 198,299. (No model.)

*To all whom it may concern:*

Be it known that I, JOHN A. LANTZ, of Pittsburg, in the county of Allegheny and State of Pennsylvania, have invented a new and useful Improvement in Couplings for Electrical Wires; and I do hereby declare the following to be a full, clear, and exact description thereof.

Much labor and time have heretofore been expended in the coupling of the line-wires of electric-lighting systems, where it is necessary to splice parts of a continuous line, or to attach branch service-wires to the main line-wire, because of the crude appliances and methods which have been used for that purpose. This is especially so in systems of incandescent lighting, because of the heavy line-wires therein employed.

It is the object of my invention to cheapen the cost and to reduce the labor of constructing and repairing such lines.

In the accompanying drawings, with reference to which I shall describe my improvement, Figure 1 is a plan view of a part of an incandescent line-wire, illustrating my invention, the parts being shown of about their natural size. Fig. 2 is a vertical cross-section on the line $x\,x$ of Fig. 1, viewed in the direction of the visual arrow A. Fig. 3 is a vertical section on the line $y\,y$ of Fig. 1.

Like symbols of reference indicate like parts in each.

In the drawings the line-wire is shown in two sections or pieces, $a$ and $b$, and 2 is the coupling-piece by which these sections are united.

As shown in Figs. 1 and 3, the socket 2 is cylindriform, and consists of two semi-cylindrical sections, $c$ and $d$, the ends of which are screw-threaded, as at $e$. At the center of the sections $c$ and $d$ their axial grooves are widened, so that when the sections are put together there shall be an enlarged central cavity, $f$.

The coupling-piece is applied as follows: The ends of the adjacent line-sections $a$ and $b$, which are to be coupled, are upset, so as to form flanged heads $a'$ and $b'$, of greater diameter than that of the wire, and greater also than the diameter of the axial bore of the coupling 2. The headed wires $a\,b$ are then laid in the groove of one of the sections, $c$, of the coupling, with their heads $a'$ and $b'$ in the enlarged recess $f$. The other section, $d$, of the coupling is then superposed upon the section $c$, so as to inclose the wire, and the two parts are then finally united by screwing caps or rings $h$ upon the threaded ends of the coupling, as shown in Figs. 1 and 3. By reason of the heads $a'$ and $b'$ the wires cannot be drawn from the coupling and a very secure union is effected.

The coupling can be adjusted and removed in a very short time. It is convenient and cheap.

In Figs. 1 and 2 I show a modification of my invention designed for use in connecting branch wires with the main line-wire. 3 indicates the coupling, which is made of a T form in two sections, $i$ and $j$, which, when placed together as shown in the drawings, afford a cylindrical bore through the arms of the T for the line-wire, and a transverse bore through the shank of the T for the branch wire. At the inner end of the latter bore is an enlarged recess, $k$.

In applying the coupling, the parts are placed together on the line-wire and the branch wire so that the line-wire shall be in the bore in the head of the T, and that the branch wire $m$ shall be in the transverse bore, the flanged head $m'$ being in the recess $k$. The sections of the coupling are then suitably locked together, preferably by a screw cap or ring, $h$, at one end, and by a bolt and nut, $n$, at the other.

In both the forms of coupling which I have described there is no need that the connected wires should be in direct contact with each other, since each is in contact with the coupling, which, being metallic, establishes electrical communication between the wires.

The coupling device which I have described may be used with advantage as a binding-post for dynamos or other electrical machines.

I claim as my invention—

1. The combination, with the electrical line-wires, of a coupling consisting of a metallic tubular socket divided lengthwise into separable parts, inclosing and in electrical contact with the ends of the wires, and devices, substantially as described, connecting the parts of the coupling and clamping them on the wires, substantially as and for the purpose specified.

2. The combination, with an electrical line wire having a flanged or upset end, of a coupling for connecting said wire to a second wire or electrical instrument, said coupling consisting of a tubular socket divided lengthwise into separable parts, and having an internal enlarged recess for the flanged end of the wire, substantially as and for the purpose specified.

In testimony whereof I have hereunto set my hand this 31st day of March, A. D. 1886.

JOHN A. LANTZ.

Witnesses:
 THOMAS W. BAKEWELL,
 W. B. CORWIN.